United States Patent Office 2,899,434
Patented Aug. 11, 1959

2,899,434

2-PHENYLAMINO-1,3-DIAZACYCLOHEXENE-2

Barry M. Bloom, Jackson Heights, N.Y., assignor to Chas. Pfizer & Co., Inc., New York, N.Y., a corporation of Delaware No Drawing. Application October 18, 1956
Serial No. 616,593

11 Claims. (Cl. 260—256.4)

This invention is concerned with new and highly effective therapeutic agents. In particular it is concerned with substituted and unsubstituted phenylamino-1,3-diazacyclohexene-2 and their pharmaceutically acceptable acid addition salts. It has been found that these materials are potent regulators of the cardiovascular system, more particularly, they are pressor amines.

The term "pressor amine" has a definite meaning to one skilled in the art. It refers to an organic amine which has the physiologiacl effect of vaso-constriction and other epinephrine like properties. These materials cause constrictions of the blood vessel walls thereby decreasing the volume of the blood vessels and increasing the blood pressure. They are used topically to cause constriction of the blood vessels of the nose in treatment of allergic rhinitis, sinusitis, acute coryza and hay fever.

The compounds of the present invention have pressor amine properties when they are unsubstituted or substituted with substituents to be recited hereinafter.

The substituents may be divided into classes according to whether they are substituted on the phenyl ring, the exocyclic bridge nitrogen atom between the phenyl ring and the diazacyclohexene ring, or the carbon atoms of the diazacyclohexene ring.

The substituents on the phenyl ring include hydroxyl groups, halogen atoms, that is, chlorine, bromine and iodine, alkyl groups containing up to four carbon atoms and alkoxy and thioalkyl groups containing up to three carbon atoms.

The substituents which are effective on the exocyclic nitrogen atom of the diazacyclohexene ring are alkyl groups containing up to four carbon atoms. The substituents on the numbers four and six carbon atoms of the diazacyclohexene ring are alkyl groups containing up to four carbon atoms. In addition to alkyl groups containing up to four carbon atoms, the number five carbon atom can also be substituted with an hydroxyl group.

The following list is illustrative of the compounds within the purview of this invention.

2-(phenylamino)-5-hydroxy-1,3-diazacyclohexene-2.
2-(N-methyl-phenylamino)-1,3-diazacyclohexene-2.
2-(N-n-butyl-phenylamino)-1,3-diazacyclohexene-2.
2-(2',4'-dichloro-phenylamino)-1,3-diazacyclohexene-2.
2-(2',4'-diethoxy-phenylamino)-1,3-diazacyclohexene-2.
2-(2',4',dihydroxy-phenylamino)-1,3-diazacyclohexene-2.
2-(2',6'-di-n-butyl-phenylamino)-1,3-diazacyclohexene-2.
2-(phenylamino)-4,5-dimethyl-1,3-diazacyclohexene-2.
2-(phenylamino)-4,5-di-sec-butyl-1,3-diazacyclohexene-2.
2-(2',4',6'-trithiopropyl-phenylamino)-1,3-diazacyclohexene-2.
2-(phenylamino)-4,5-di-isopropyl-1,3-diazacyclohexene-2.
2-(3',4'-dibromo-phenylamino)-4-ethyl-1,3-diazacyclohexene-2.
2-(2',4'-diiodo-phenylamino)-1,3-diazacyclohexene-2.
2-(N-2',4',6'-tetramethylphenylamino)-1,3-diazacyclohexene-2.
2-(2',4',6'-trithiomethyl-phenylamino)-1,3-diazacyclohexene-2.
2-(2',4',6'-tripropoxy-phenylamino)-1,3-diazacyclohexene-2.
2-(2',4'-di-n-butyl-phenylamino)-1,3-diazacyclohexene-2.
2-(2'-iodo-phenylamino)-5,5-diethyl-diazacyclohexene-2.
2-(3',4'-dibromo-phenylamino)-4,5,6-triethyl-1,3-diazacyclohexene-2.
2-(phenylamino)-4,6-di-n-butyl-1,3-diazacyclohexene-2.

The compounds of my invention are prepared by the reaction between an isothiouronium salt and a diaminoalkane. The isothiouronium salt is prepared by the reaction between an alkyl or aralkyl halide or sulfate and an N-phenyl substituted thiourea.

The reaction of the isothiouronium salt with the diamino compound is best carried out in a polar hydroxylic solvent such as water or the lower aliphatic alcohols. Such alcohols as methanol, ethanol, propanol, butanol and pentanol are particularly suitable. Temperature of the reaction will vary between room temperature and the boiling point of the solvent employed. In the usual case this is between 20° and 140° C. The preferred temperature range is between 60° and 80° C. At atmospheric pressure, methyl and ethyl alcohol are the preferred solvents because their boiling points are within this preferred temperature range.

Although small amounts of the pharmaceutically active salt are undoubtedly formed immediately after mixing the isothiouronium salt and the diamino compound in the chosen solvent, the best yields are obtained if reaction is allowed to continue for periods which may vary from fifteen minutes with the more reactive compounds to as long as twenty-four hours for compounds which react more slowly. In any event the acid addition salts precipitate when the solvent is removed in vacuo.

The synthesis applied to the compounds of the present invention is illustrated below.

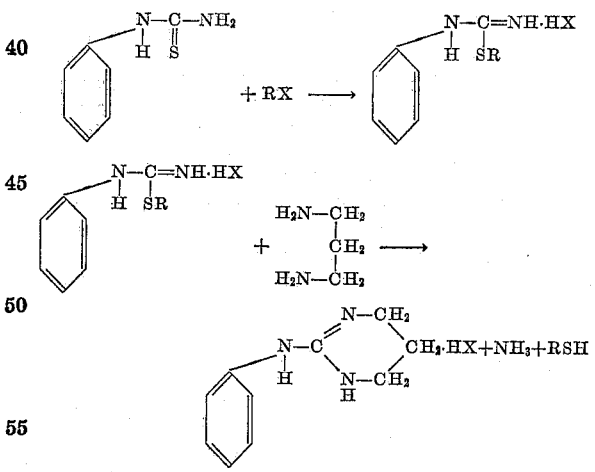

By reference to the above equations it can be seen that the size of the alkyl or aralkyl group of the halide or sulfate used to form the isothiouronium salt is of no consequence as far as the final structure of the active compounds of my invention is concerned since it is ultimately removed as a mercaptan. It is, however, convenient to use a low molecular weight alkyl halide or sulfate such as methyl iodide or dimethyl sulfate since the mercaptans which ultimately form from these types of compounds are relatively volatile and easily removed.

The symbol "X" in the above equations refers to a chloride, bromide, iodide, or sulfate anion which together with the active cation forms a pharmaceutically acceptable acid addition salt. Other pharmaceutically acceptable acid addition salts such as, for example, succinate, maleate, tartrate, citrate and glycolate can be formed from the halides or sulfates. They can be formed, for example, by converting the halide or sulfate to the free base and treating the free base with the chosen acid in aqueous solution. Other methods of obtaining these valuable pharmaceutically acceptable acid addition salts will be known to those skilled in the art.

The diaminoalkanes of the above reaction include diaminoalkanes such as 1,3-diaminopropane and alkyl substituted derivatives wherein the alkyl group and/or groups which replace the hydrogen and/or hydrogens on various carbon atoms contain up to four carbon atoms. Also included are the above 1,3-diaminoalkanes in which the carbon atom between the two carbon atoms which carry amino groups is substituted with an hydroxyl group. Compounds of this latter type give rise to 5-hydroxy substituted 1,3-diazacyclohexenes-2.

More specific directions for the preparation of these valuable compounds can be obtained by reference to the appended examples.

The compounds of this invention may be administered alone but are generally administered as a composition with a pharmaceutical carrier selected on the basis of a chosen route of administration and standard pharmaceutical practice. For example, they may be administered orally in the form of tablets containing such excipients as starch, milk sugar, certain types of clay, etc. They may be administered in capsules, either alone or in admixture with the same or equivalent excipients. They may also be administered orally in the form of elixirs or oral suspensions which may contain flavoring or coloring agents. They may be injected parenterally, that is, for example, intramuscularly or subcutaneously. For parenteral administration they are best used in the form of a sterile aqueous solution which may contain other solutes. For example, enough saline or glucose to make the solution isotonic.

The physician will determine the dosage which will be most suitable for an individual patient and it will vary with the form of administration, the age, weight and response of the particular patient. It has been found that dosage units containing from 0.1 mg. to 100 mg. are generally useful. Those dosage unit forms which are prepared for subcutaneous administration will most usually contain the lowest concentration of the active ingredient. Dosage forms for intramuscular administration will be somewhat higher, and those dosage forms intended for oral administration, for example, elixirs, tablets or capsules will contain still more of the active ingredient.

As noted above compositions of this invention may take a variety of forms. Various diluents may be employed and the percentage of active ingredient may be varied. It is necessary that the active ingredient constitute a proportion of the composition such that a suitable dosage form will be obtained. Obviously several dosage unit forms may be administered at about the same time. Although a composition with less than 0.05% of the active ingredient is useful, it is preferred to use compositions containing at least 0.05%. Activity increases with concentration of the agent. It has been found that the percentage of active ingredient may be 10%, 50%, 75%, 90% or an even higher proportion. For example, tablets may be prepared with a minor proportion of binding agent or diluent and a major proportion of active materials. Tablets containing from 0.1 mg. to 100 mg. are particularly useful.

The following examples are given solely for the purpose of illustration and are not to be construed as limitations of this invention, many variations of which are possible without departing from the spirit or scope thereof.

EXAMPLE I 2-phenylamino-1,3-diazacyclohexene-2 hydrobromide

N-phenyl-thiourea (50 g.) and 20 ml. of butyl bromide are refluxed in 200 ml. of methanol for one hour. The solution is cooled and most of the solvent removed in vacuo. The isothiouronium salt which is recovered by filtration is taken up in an equimolar methanol solution of 1,3-diaminopropane and heated under reflux for ten hours. The solvent is partially removed in vacuo to precipitate the hydrobromide salt.

EXAMPLE II 2-phenylamino-1,3-diazacyclohexene-2 hydriodide

N-phenyl-thiourea (50 g.) and 20 ml. of methyl iodide are refluxed in 200 ml. of methanol for one hour. The solution is cooled and most of the solvent removed in vacuo. The isothiouronium salt which is recovered by filtration is taken up in an equimolar methanol solution of 1,3-diaminopropane and heated under reflux for ten hours. The solvent is partially removed in vacuo to precipitate the hydriodide salt.

EXAMPLE III 2-(2'-chlorophenylamino)-1,3-diazacyclohexene-2 hydriodide

N-(2-chlorophenyl)-thiourea (50 g.) and 20 ml. of methyl iodide are refluxed in 200 ml. of methanol for one hour. The solution is cooled and most of the solvent removed in vacuo. The isothiouronium salt which is recovered by filtration is taken up in an equimolar methanol solution of 1,3-diaminopropane and heated under reflux for ten hours. The solvent is partially removed in vacuo to precipitate the hydriodide salt.

EXAMPLE IV 2-(2',5'-dichlorophenylamino)-1,3-diazacyclohexene-2 hydriodide

N-(2,5-dichlorophenyl)-thiourea (50 g.) and 20 ml. of methyl iodide are refluxed in 200 ml. of methanol for one hour. The solution is cooled and most of the solvent removed in vacuo. The isothiouronium salt which is recovered by filtration is taken up in an equimolar methanol solution of 1,3-diaminopropane and heated under reflux for ten hours. The solvent is partially removed in vacuo to precipitate the hydriodide salt.

EXAMPLE V 2-(2',4',6'-triiodophenylamino)-1,3-diazacyclohexene-2

N-(2,4,6-triiodophenyl)-thiourea (50 g.) and 20 ml. of methyl iodide are refluxed in 200 ml. of methanol for one hour. The solution is cooled and most of the solvent removed in vacuo. The isothiouronium salt which is recovered by filtration is taken up in an equimolar methanol solution of 1,3-diaminopropane and heated under reflux for ten hours. The solvent is partially removed in vacuo to precipitate the hydriodide salt.

The free base is obtained by treating an aqueous solution of the acid addition salt with aqueous potassium carbonate, extracting the aqueous solution with methylene dichloride and removing the organic solvent in vacuo.

EXAMPLE VI 2-(2',4'-dibromophenylamino)-1,3-diazacyclohexene-2

N-(2,4-dibromophenyl)-thiourea (50 g.) and 20 ml. of butyl bromide are refluxed in 200 ml. of methanol for one hour. The solution is cooled and most of the solvent removed in vacuo. The isothiouronium salt which is recovered by filtration is taken up in an equimolar methanol solution of 1,3-diaminopropane and heated under reflux for ten hours. The solvent is partially removed in vacuo to precipitate the hydrobromide salt.

The free base is obtained by treating an aqueous solution of the acid addition salt with aqueous potassium carbonate, extracting the aqueous solution with methylene dichloride and removing the organic solvent in vacuo.

EXAMPLE VII

*2-(2′,4′-diethoxyphenylamino)-1,3-diazacyclohexene-2*

N-(2,4-diethoxyphenyl)-thiourea (50 g.) and 20 ml. of butyl bromide are refluxed in 200 ml. of methanol for one hour. The solution is cooled and most of the solvent removed in vacuo. The isothiouronium salt which is recovered by filtration is taken up in an equimolar methanol solution of 1,3-diaminopropane and heated under reflux for ten hours. The solvent is partially removed in vacuo to precipitate the hydrobromide salt.

The free base is obtained by treating an aqueous solution of the acid addition salt with aqueous potassium carbonate, extracting the aqueous solution with methylene dichloride and removing the organic solvent in vacuo.

EXAMPLE VIII

*2-(4′-propoxyphenylamino)-5-hydroxy-1,3-diazacyclohexene-2 hydriodide*

N-(4-propoxyphenyl)-thiourea (50 g.) and 20 ml. of methyl iodide are refluxed in 200 ml. of methanol for one hour. The solution is cooled and the solvent removed in vacuo. The isothiouronium salt which is recovered by filtration is taken up in an equimolar methanol solution of 2-hydroxy-1,3-diaminopropane and heated under reflux for two hours. The solvent is partially removed in vacuo to precipitate the hydriodide salt of 2-(4′-propoxyphenylamino)-5-hydroxy-1,3-diazacyclohexene-2.

EXAMPLE IX

*2-(2′-thioethylphenylamino)-1,3-diazacyclohexene-2*

N-(2-thioethylphenyl)-thiourea (50 g.) and 20 ml. of butyl chloride are refluxed in 200 ml. of methanol for one hour. The solution is cooled and most of the solvent removed in vacuo. The isothiouronium salt which is recovered by filtration is taken up in an equimolar methanol solution of 1,3-diaminopropane and heated under reflux for ten hours. The solvent is partially removed in vacuo to precipitate the hydrochloride salt.

The free base is obtained by treating an aqueous solution of the acid addition salt with aqueous potassium carbonate, extracting the aqueous solution with methylene dichloride and removing the organic solvent in vacuo.

EXAMPLE X

*2-(2′,3′,5′-trithiopropylphenylamino)-1,3-diazacyclohexene-2 hydriodide*

N-(2,3,5-trithiopropylphenyl)-thiourea (50 g.) and 20 ml. of methyl iodide are refluxed in 200 ml. of methanol for one hour. The solution is cooled and most of the solvent removed in vacuo. The isothiouronium salt which is recovered by filtration is taken up in an equimolar methanol solution of 1,3-diaminopropane and heated under reflux for ten hours. The solvent is partially removed in vacuo to precipitate the hydriodide salt.

EXAMPLE XI

*2-(N-isobutylphenylamino)-1,3-diazacyclohexene-2*

N-isobutyl-N-phenyl-thiourea (50 g.) and 20 ml. of methyl iodide are refluxed in 200 ml. of methanol for one hour. The solution is cooled and most of the solvent removed in vacuo. The isothiouronium salt which is recovered by filtration is taken up in an equimolar methanol solution of 1,3-diaminopropane and heated under reflux for ten hours. The solvent is partially removed in vacuo to precipitate the hydriodide salt.

The free base is obtained by treating an aqueous solution of the acid addition salt with aqueous potassium carbonate, extracting the aqueous solution with methylene dichloride and removing the organic solvent in vacuo.

EXAMPLE XII

*2-phenylamino-4-butyl-1,3-diazacyclohexene-2*

N-phenyl-thiourea (50 g.) and 20 ml. of methyl iodide are refluxed in 200 ml. of methanol for one hour. The solution is cooled and the solvent removed in vacuo. The isothiouronium salt which is recovered by filtration is taken up in an equimolar methanol solution of 1,3-diaminoheptane and heated under reflux for ten hours. The solvent is partially removed in vacuo to precipitate the hydriodide salt of 2-phenylamino-4-butyl-1,3-diazacyclohexene-2.

The free base is obtained by treating an aqueous solution of the hydriodide with aqueous sodium carbonate, extracting the aqueous solution with methylene chloride and removing the organic solvent in vacuo.

EXAMPLE XIII

*2-(2′-chlorophenylamino)-4,6-diethyl-1,3-diazacyclohexene-2*

N-(2-chlorophenyl)-thiourea (50 g.) and 20 ml. of methyl iodide are refluxed in 200 ml. of methanol for one hour. The solution is cooled and most of the solvent removed in vacuo. The isothiouronium salt which is recovered by filtration is taken up in an equimolar methanol solution of 3,5-diaminoheptane and heated under reflux for ten hours. The solvent is partially removed in vacuo to precipitate the hydriodide salt.

The free base is obtained by treating an aqueous solution of the acid addition salt with aqueous potassium carbonate, extracting the aqueous solution with methylene dichloride and removing the organic solvent in vacuo.

EXAMPLE XIV

*2-phenylamino-4,5,6-triethyl-1,3-diazacyclohexene-2 hydriodide*

N-phenyl-thiourea (50 g.) and 20 ml. of methyl iodide are refluxed in 200 ml. of methanol for one hour. The solution is cooled and most of the solvent removed in vacuo. The isothiouronium salt which is recovered by filtration is taken up in an equimolar methanol solution of 4-ethyl-3,5-diaminoheptane and heated under reflux for ten hours. The solvent is partially removed in vacuo to precipitate the hydriodide salt.

EXAMPLE XV

*2-phenylamino-5-n-butyl-1,3-diazacyclohexene-2*

N-phenyl-thiourea (50 g.) and 20 ml. of butyl chloride are refluxed in 200 ml. of methanol for one hour. The solution is cooled and most of the solvent removed in vacuo. The isothiouronium salt which is recovered by filtration is taken up in an equimolar methanol solution of 1-amino-2-aminomethylhexane and heated under reflux for ten hours. The solvent is partially removed in vacuo to precipitate the hydrochloride salt.

The free base is obtained by treating an aqueous solution of the acid addition salt with aqueous potassium carbonate, extracting the aqueous solution with methylene dichloride and removing the organic solvent in vacuo.

EXAMPLE XVI

*2-(2′,4′-dihydroxyphenylamino)-1,3-diazacyclohexene-2*

N-2,4-dihydroxyphenyl)-thiourea (50 g.) and 20 ml. of butyl chloride are refluxed in 200 ml. of methanol for one hour. The solution is cooled and most of the solvent removed in vacuo. The isothiouronium salt which is recovered by filtration is taken up in an equimolar methanol solution of 1,3-diaminopropane and heated under reflux for ten hours. The solvent is partially removed in vacuo to precipitate the hydrochloride salt.

The free base is obtained by treating an aqueous solution of the acid addition with aqueous potassium carbonate, extracting the aqueous solution with methylene dichloride and removing the organic solvent in vacuo,

EXAMPLE XVII

2 - (2',4',6' - trihydroxyphenylamino) - 1,3 - diazacyclohexene-2 hydriodide

N-(2,4,6-trihydroxyphenyl)-thiourea (50 g.) and 20 ml. of methyl iodide are refluxed in 200 ml. of methanol for one hour. The solution is cooled and most of the solvent removed in vacuo. The isothiouronium salt which is recovered by filtration is taken up in an equimolar methanol solution of 1,3-diaminopropane and heated under reflux for ten hours. The solvent is partially removed in vacuo to precipitate the hydriodide salt.

EXAMPLE XVIII

2 - (N - butyl - phenylamino) - 1,3 - diazacyclohexene - 2 glycolate

A benzene solution (50 ml.) containing 2.4 g. of 2-(N-butyl-phenylamino)-1,3-diazacyclohexene-2 is shaken with 50 ml. of an aqueous solution containing 7.6 of glycolic acid. The layers are separated and the glycolic acid salt of the active base isolated from the aqueous phase by evaporation of the solvent in vacuo.

Other pharmaceutically acceptable acid addition salts of the active bases of this invention are similarly prepared.

EXAMPLE XIX

A tablet base is prepared by blending the following ingredients in the proportion by weight indicated.

| | |
|---|---:|
| Sucrose U.S.P. | 82.0 |
| Tapioca starch | 13.6 |
| Magnesium stearate | 4.4 |

Into this tablet there is blended a sufficient amount of 2-(2'-chlorophenylamino)-1,3-diazacyclohexene-2 hydriodide to provide tablets each containing 50 mg. of active ingredient.

EXAMPLE XX

Into the table base of Example 19 there is blended a sufficient amount of the hydriodide salt of 2-(2',4'-diethoxyphenylamino)-1,3-diazacyclohexene-2 to provide tablets each containing 0.5 mg. of active ingredient.

EXAMPLE XXI

A tablet base is prepared by blending the following ingredients in the proportion by weight indicated.

| | |
|---|---:|
| Sucrose U.S.P. | 80.3 |
| Tapioca starch | 13.2 |
| Magnesium stearate | 6.5 |

Into this base there is blended a sufficient amount of 2-(2',4'-dichlorophenylamino)-1,3-diazacyclohexene-2 to provide tablets each containing 75 mg. of active ingredient.

EXAMPLE XXII

Into the tablet base of Example 21 there is blended a sufficient amount of hydrobromide salt of 2-phenylamino-1,3-diazacyclohexene-2 hydrobromide to provide tablets each containing 0.1 mg. of active ingredient.

EXAMPLE XXIII

Ten liters of distilled water for injection, U.S.P. are poured into a 20 l. Pyrex glass bottle. To this water is added sufficient 2-phenylamino-1,3-diazacylcohexene-2 hydriodide to provide a 0.1 percent solution by weight.

EXAMPLE XXIV

A blend is prepared containing the following ingredients:

| | Grams |
|---|---:|
| Calcium carbonate U.S.P. | 17.60 |
| Dicalcium sulfate | 18.80 |
| Magnesium trisilicate U.S.P. | 5.20 |
| Lactose U.S.P. | 5.20 |
| Potato starch | 5.20 |
| 2 - (2' - thioethylphenylamino) - 1,3 - diazacyclohexene-2 hydrochloride | 4.00 |
| Magnesium stearate A | 0.80 |
| Magnesium stearate B | 0.32 |

This blend is divided and formed into tablets each containing 5 mg. of active ingredient.

What is claimed is:

1. A compound selected from the group represented by the formula:

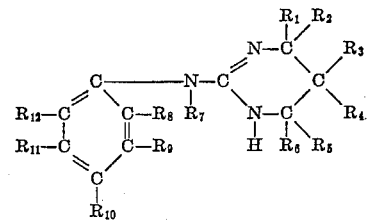

wherein $R_1$, $R_2$, $R_5$, $R_6$ and $R_7$ are selected from the group consisting of hydrogen and 1 to 4 carbon atom alkyl; $R_3$ and $R_4$ are selected from the group consisting of hydrogen, 1 to 4 carbon atom alkyl and hydroxy; and $R_8$, $R_9$, $R_{10}$, $R_{11}$ and $R_{12}$ are selected from the group consisting of hydrogen, chloro, bromo, iodo, hydroxy, 1 to 4 carbon atom alkyl, and alkoxy and thioalkyl containing up to 3 carbon atoms; and the pharmaceutically acceptable acid addition salts thereof.

2. 2 - (chloro-substituted - phenylamino) - 1,3 - diazacyclohexene-2.

3. 2 - (alkyl - substituted - phenylamino) - 1,3 - diazacyclohexene-2 wherein the alkyl group contains up to four carbon atoms.

4. 2 - (alkoxy - substituted - phenylamino) - 1,3 - diazacyclohexene-2 wherein the alkoxy group contains up to three carbon atoms.

5. 2 - (thioalkyl - substituted - phenylamino) - 1,3 - diazacyclohexene-2 wherein the thioalkyl group contains up to three carbon atoms.

6. 2-phenylamino-1,3-diazacyclohexene-2.

7. 2-(2'-chlorophenylamino)-1,3-diazacyclohexene-2.

8. 2 - (2',4' - diethoxy - phenylamino) - 1,3 - diazacyclohexene-2.

9. 2 - (2' - thioethyl - phenylamino) - 1,3 - diazacyclohexene-2.

10. 2 - (bromo - substituted - phenylamino) - 1,3 - diazacyclohexene-2.

11. 2 - (iodo - substituted - phenylamino) - 1,3 - diazacyclohexene-2.

References Cited in the file of this patent

UNITED STATES PATENTS 1,912,849     Kranzlein     June 6, 1933

OTHER REFERENCES

McKay et al.: Jour. American Chem. Soc., vol. 71, pp. 766–770 (1949).